United States Patent [19]

Scholefield

[11] Patent Number: 4,628,242

[45] Date of Patent: Dec. 9, 1986

[54] SYSTEM FOR CHARGING A RECHARGEABLE BATTERY

[75] Inventor: Clifford L. Scholefield, Gainesville, Fla.

[73] Assignee: General Electric Company, Gainesville, Fla.

[21] Appl. No.: 814,442

[22] Filed: Dec. 30, 1985

[51] Int. Cl.$^4$ .................. H02J 7/00; H01M 10/46
[52] U.S. Cl. ........................................... 320/2; 429/97
[58] Field of Search ........................... 320/2-5; 429/7, 96-100

[56] References Cited

U.S. PATENT DOCUMENTS

| | | | |
|---|---|---|---|
| 2,995,695 | 8/1961 | Reich | 320/2 |
| 3,070,748 | 12/1962 | Worobey et al. | 320/2 |
| 3,089,072 | 5/1963 | Jephcott | 320/2 |
| 3,506,902 | 4/1970 | Sullivan | 320/2 |
| 3,930,889 | 1/1976 | Ruggiero et al. | 429/97 |
| 4,147,163 | 4/1979 | Newman et al. | 320/2 |
| 4,147,838 | 4/1979 | Leffingwell | 320/2 |
| 4,382,219 | 5/1983 | Heine et al. | 320/2 |
| 4,489,268 | 12/1984 | Beachy | 320/2 |

Primary Examiner—R. J. Hickey
Attorney, Agent, or Firm—Henry J. Policinski

[57] ABSTRACT

A charging system is provided for use in an energy-using device operable from an external source of A-C power and from either batteries of either the rechargeable or non-chargeable type. The charging system effects charging of batteries of the rechargeable type upon connection of the energy-using device with the external source of A-C power. The charging system includes a charging adapter for insertion with rechargeable batteries into the energy-using device. Removal of the charging adapter from the energy-using device is effective to preclude charging of batteries of a non-rechargeable type.

4 Claims, 4 Drawing Figures

SYSTEM FOR CHARGING A RECHARGEABLE BATTERY

This invention relates to a system for charging rechargeable batteries within an energy-using device containing a charging circuit and more specifically to a charging system which permits charging of rechargeable batteries within the energy-using device but which precludes non-rechargeable batteries of the same general type, configuration and size from being charged.

BACKGROUND OF THE INVENTION

U.S. Pat. No. 4,489,268 describes a rechargeable battery containing a plurality of rechargeable electrochemical cells confined in a battery housing. The rechargeable battery includes first and second power terminal contacts disposed at opposite ends of the battery which are adapted to engage corresponding terminals in the energy-using device. The battery is adapted to be received by a cavity of the energy-using device which may be comprised, for example, a portable radio, television or tape recorder. When the energy-using device is operated in a first mode wherein it receives power from an external source of AC power, the charging circuit in the energy-using device provides charging current to the battery whereby the rechargeable battery is automatically recharged. When the energy-using device operates in a second battery powered mode, the load of the energy-using device receives power from the rechargeable batteries.

The over-all length of the rechargeable battery depicted in the '268 patent may be the same as the over-all length of a plurality of standard size non-rechargeable batteries such as standard AAA, AA, C or D size batteries. Hence, a user of the energy-using device, rather than employing the rechargeable battery taught in the '268 patent to provide battery power to the load of the energy-using device, may instead employ a plurality of individual standard size non-rechargeable batteries connected in series to provide battery power. In order to prevent such non-rechargeable batteries from being charged in the energy-using device during operation in the aforementioned first mode, the charging circuit within the energy-using device is provided with a charging terminal contact which engages a circumferentially extending charging terminal contact ring supported on the battery housing confining the individual rechargeable cells. The non-rechargeable batteries, having neither a housing confining a plurality of batteries nor the charging terminal contact ring on the housing, will not contact the charging terminal contact in the charging circuit and hence will not be charged when inserted into the energy-using device.

The invention described in the '268 patent not only precludes charging of a plurality of series connected non-rechargeable batteries by the charging circuit in the energy-using device, but also precludes charging of a plurality of rechargeable batteries of the same general type, size and configuration as standard size non-rechargeable batteries. Charging is precluded because the standard size rechargeable batteries do not have the charging terminal contact ring. Since the individual rechargeable batteries are sold in the same general standard types, configurations and sizes of non-rechargeable batteries, a plurality of standard rechargeable batteries may be inserted in the energy-using device to deliver battery power to the load of the energy-using device. However, these standard rechargeable batteries will not be automatically charged by the charging circuit of the energy-using device. Accordingly, while a consumer who has purchased standard rechargeable batteries will be able to use the rechargeable batteries to provide battery power to the energy-using device, the consumer will not be able to charge the standard rechargeable batteries with the charging circuit in the energy-using device. The present invention addresses this problem.

SUMMARY OF THE INVENTION

Accordingly, it is an object of the present invention to provide a charging system in an energy-using device which will automatically charge rechargeable batteries of a standard type, size and configuration.

It is another object of the present invention to provide a charging system in an energy-using device which will not charge non-rechargeable batteries of the same standard type, size and configuration as rechargeable batteries.

It is yet another object of the present invention to provide a charging system for an energy-using device which receives battery power from either rechargeable or non-rechargeable batteries.

Briefly stated, these and other objects, which will become apparent from the following specification and appended drawings, are accomplished by the present invention which, in one form, presents a charging system for use in an energy-using device adapted to operate from either an external source of A-C power or from either rechargeable or non-rechargeable batteries of the same general size and configuration. The system comprises an electrical charging circuit disposed in the housing of an energy-using device. The housing includes a cavity for receiving therein batteries of either the rechargeable or non-rechargeable type with each of the battery types having a positive and negative power terminal. The system further includes a pair of discharge terminals residing in the cavity and permanently affixed within the housing. One discharge terminal is adapted for current conducting engagement with the positive power terminal of a non-rechargeable battery type and the other discharge terminal adapted for current conducting engagement with the negative power terminal of the non-rechargeable battery type. A charging contact is connected in the charging circuit and resides in the cavity spaced-apart from each of the discharge terminals. A removable charging adapter is provided for insertion into the cavity when the rechargeable battery is inserted into the cavity. The charging adapter carries current conducting means for engaging said charging contact and for providing an electrical current conducting path between the charging contact and one of the power terminal contacts of the rechargeable battery. The other power terminal of the rechargeable battery engages one of the discharge terminals whereby one of the discharge terminals comprise a second charging terminal during charging of the rechargeable battery. The removable adapter is extracted from the cavity when a non-rechargeable battery type resides in the cavity to preclude charging of the non-rechargeable battery.

BRIEF DESCRIPTION OF THE DRAWINGS

While the specification concludes with claims particularly pointing out and distinctly claiming the present invention, the invention will be more readily understood from the following description of the preferred embodiments which are given by way of example with the accompanying drawings in which:

DETAILED DESCRIPTION OF THE PREFERRED EMBODIMENT

Figure 1:
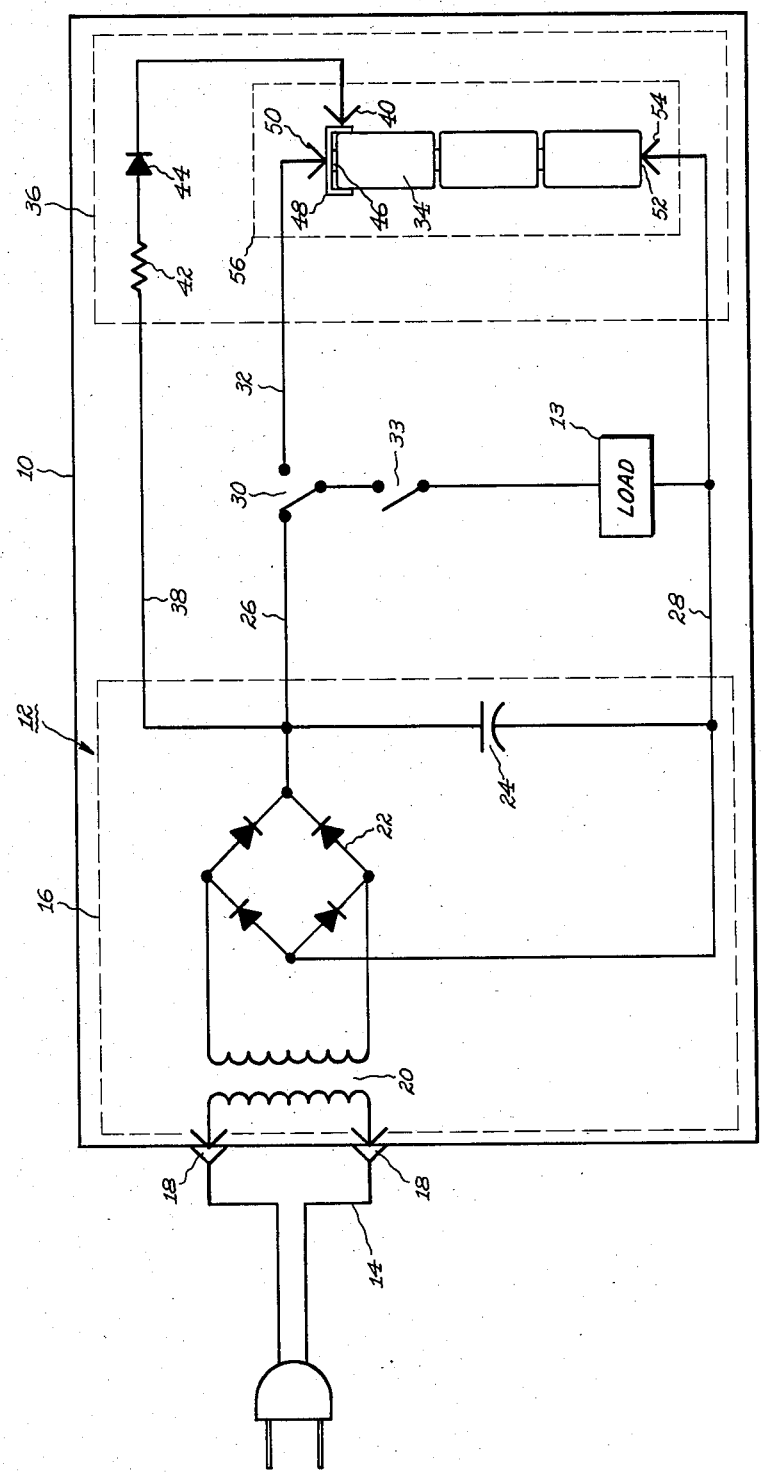
FIG. 1 depicts schematically an energy-using device including circuitry for charging a battery and for providing energy to the load of the energy-using device.

While this invention is susceptible of embodiment in many different forms, there is shown in the drawings and described herein in detail in the specification preferred embodiments of the invention, and modifications thereto, with the understanding that the present disclosure is to be considered exemplary of the principles of the invention and not so limiting the invention to the embodiments illustrated and described.

Referring now to FIG. 1, there is schematically depicted, generally at 10, an energy-using device such as a portable radio, television or tape player. Energy-using device 10 includes an electrical circuit 12 which, in a manner more fully hereinafter to be explained, is adapted, in a first mode, to provide electrical energy from an external source 14 of A-C power to a load 13 of energy-using device 10. In the first mode, A-C power is delivered via first power circuit means in the form of electrical circuit circumscribed by dashed outline 16. Power circuit 16 is comprised of a pair of electrical contacts 18 which may be selectively connected to a source of external electrical energy 14. Power circuit 16 is also comprised of transformer 20, rectifier 22 and filter 24 arranged in a conventional manner to supply a substantially constant voltage across current conductor lines 26 and 28 and hence to load 13. In a first mode, that is when contacts 18 are in electrical contact with external source of A-C power 14, power circuit 16 delivers current to load 13. Electrical circuit 12 includes switch means 30 which connects load 13 across lines 26 and 28 whenever electrical contacts 18 are connected to the external source of energy 14. When source 14 is unplugged from contacts 18, switch 30 (actuated by means not shown) disconnects load 13 from line 26 and connects the load 13 across current conductor lines 28 and 32 and circuit 12 is in a second (or battery powered) mode. Load 13 may then be battery powered in a manner hereinafter to be more fully described. A second switch 33, which may be manually operated is provided to turn the energy-using device, for example a radio, on or off.

With circuit 16 connected to external source of electrical energy 14, the circuit 12 is adapted, in its first mode, to also supply charging current to a rechargeable battery 34 via second charging circuit means defined by dashed outline 36. Charging circuit 36, electrically connected to circuit 16, includes current conductor line 38 connected between conductor line 26 and a charging contact 40. Current conductor line 38 has inserted therein current limiting resistor 42, for limiting the magnitude of charge current through rechargeable battery 34, and unidirectional current flow means in the form of diode 44 for permitting the flow of charging current only in one direction through current conductor line 38.

Rechargeable battery 34 may be comprised of one or a plurality of individual standard size and type rechargeable cells or batteries in sizes AA, AAA, C or D connected in series. As used herein, the term "battery" shall have its accepted meaning in the trade; namely, the term "battery" shall mean a single cell when the circuit contains a single cell or shall mean a plurality of cells electrically connected to each other when multiple cells are connected in the circuit. FIG. 1 depicts a battery comprised of a plurality of individual cells. Each individual cell is cylindrical in shape and includes a power terminal disposed at each end of the cell with the positive terminal of one cell engaging the negative power terminal of the next adjacent cell to provide for the aforementioned serial connection of the cells in the circuit. Thus rechargeable battery 34 may, in addition to being comprised of a single standard size rechargeable cell, be comprised of a plurality of standard-size rechargeable cells such that the overall length of rechargeable battery 34 is a whole number multiple of the length of a single standard size rechargeable cell. Furthermore, energy-using device 10 may interchangeably use either a rechargeable battery 34 or non-rechargeable battery each comprised of a like number of standard-size cells.

With rechargeable battery 34 inserted into electrical circuit 12, a first positive power terminal contact 46 disposed on rechargeable battery 34 is in current conducting engagement with a removable charging adapter 48. Charging adapter 48 is, in turn, in current conducting engagement with a first discharge terminal 50 and a charging contact 40 for purposes hereinafter to be described. A second negative power terminal contact 52 disposed at the opposite end of rechargeable battery 34 is in current conducting engagement with a second discharge terminal 54. When external power source 14 is disconnected from electrical contacts 18, switch 30 connects load 13 between current conducting lines 28 and 32 and hence in series with rechargeable battery 34. Electrical circuit 12 is then in the aforementioned second mode of operation. In this mode, third discharge circuit means, defined by dashed outline 56, permits energy discharged from battery 34 to be received by load 13. More specifically, current from rechargeable battery 34 flows through the circuit 56 defined by battery 34, positive power terminal contact 46, adapter 48, discharge terminal 50, conductor line 32, load 13, conductor line 28, discharge terminal 54 and negative power terminal contact 52.

When circuit 12 is in its first mode of operation, charging of rechargeable battery 34 is accomplished by the flow of charging current through charging circuit 36 defined by conductor line 38 (including resistor 42 and diode 44), charging terminal 40, adapter 48, positive power terminal contact 46, battery 34, negative power terminal contact 52, discharge terminal 54 and conductor line 28. Since, in the first mode of operation, load 13 is in parallel with battery 34, powering of load 13 by A-C power source 14 and charging of battery 34 may be accomplished simultaneously or, if switch 33 is in the off position, charging of battery 34 may be accomplished without the simultaneous delivery of power to load 13.

Figure 2:
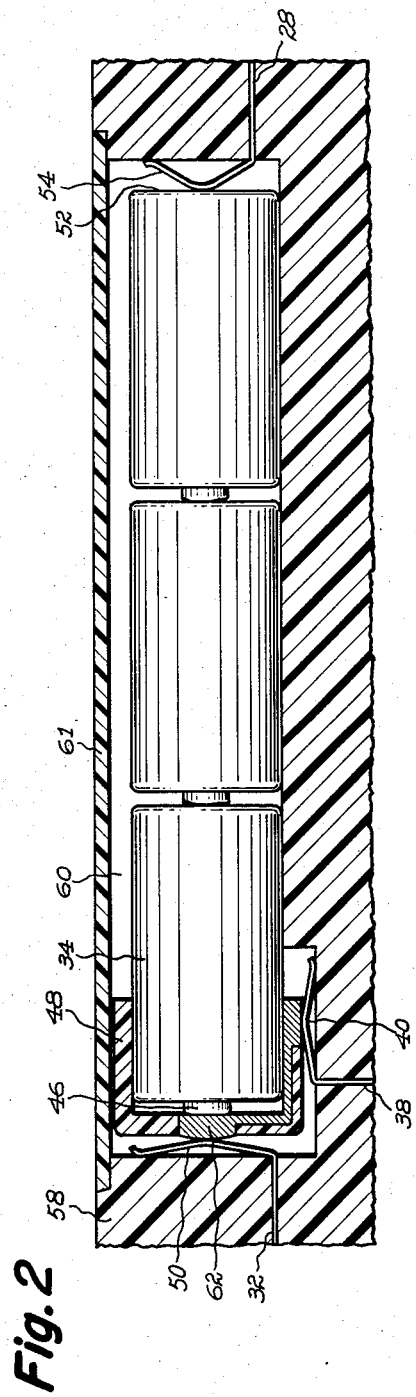
FIG. 2 depicts schematically a portion of the energy-using device of FIG. 1 in which rechargeable or non-rechargeable batteries reside.

Referring now to FIG. 2, there is schematically depicted a portion of energy-using device 10 in which the rechargeable or non-rechargeable batteries reside. More specifically, energy-using device 10 includes a housing 58 which houses and supports all of the component parts of energy-using device 10. The portion of housing 58 depicted in FIG. 2, includes an elongated cavity 60 for alternatively receiving batteries of both the rechargeable and non-rechargeable type. FIG. 2 depicts housing 58 with batteries of the rechargeable type inserted within cavity 60 whereby power terminal contacts 46 and 52 may provide electrical energy to the load 13 of energy-using device 10. Cavity 60 is closed from the external environment by cover 61.

A pair of discharge terminals 50 and 54, which may be comprised of conventional spring-type terminals, are connected in discharge circuit 56. Discharge terminals 50 and 54 reside and are permanently affixed within cavity 60 and housing 58. When batteries of the non-rechargeable type are inserted in cavity 60, discharge terminals 50 and 54 are in respective current conducting engagement with the positive and negative power terminals of the non-rechargeable battery. Such engagement permits electrical energy to be discharged by the non-rechargeable battery to load 13. Also residing and permanently affixed within cavity 60 is charging contact 40 spaced apart from discharge terminals 50 and 54 and adapted to provide charging current to rechargeable battery 34.

As previously stated above, the charging system of the present invention includes charging adapter 48 which may be selectively inserted into, and removed from, cavity 60. More specifically, charging adapter 48 is inserted into cavity 60 whenever the energy-using device 10 is operated from power supplied by batteries of the rechargeable type. Charging adapter 48 includes or carries current conducting means 62 for engaging charging contact 40 and providing a current conducting path between charging contact 40 and the positive power terminal contact 46 of rechargeable battery 34. As stated above, the other power terminal contact 52 of rechargeable battery 34 is in current conducting engagement with discharge terminal 54. When circuit 12 is in the aforementioned first mode of operation, discharge terminal 54 is operable as the second charging contact in charging circuit 56 during charging of rechargeable battery 34. Thus, charging of rechargeable battery 34 is effected by the flow of current through a current path comprising current conductor 38, current conducting means 62, positive power terminal contact 46, battery 34, negative power terminal contact 52, discharge terminal 54 and current conductor 28.

With rechargeable battery 34 and adapter 48 residing in cavity 60, current conducting means 62 is also effective to provide a current conducting path between power terminal 46 and discharge terminal 50. Conduction of current between power terminal contact 46 and discharge terminal 50 is accomplished by the engagement of current conducting means 62 simultaneously with power terminal contact 46 and discharge terminal 50. As viewed in FIG. 2, a portion of current conducting means 62 is disposed between, and in engagement with, power terminal contact 46 and discharge terminal 50. In this manner then, in addition to providing a circuit path for charge current during operation of the circuit in the aforementioned first mode, current conducting means 62 provides for a current path for current discharged from rechargeable battery 34 during operation of the circuit in the second battery powered mode.

Removable charging adapter 48 is removed from cavity 60 when non-rechargeable batteries are inserted in energy-using device 10. With adapter 48 removed, the power terminals of the non-rechargeable battery directly engage spring-like discharge terminals 50 and 54 thereby permitting the discharge of electrical energy from the non-rechargeable battery to load 13. Since removal of charging adapter 48 removes the conductive path engaging charging contact 40, charging of the non-rechargeable battery is precluded.

Figure 3:
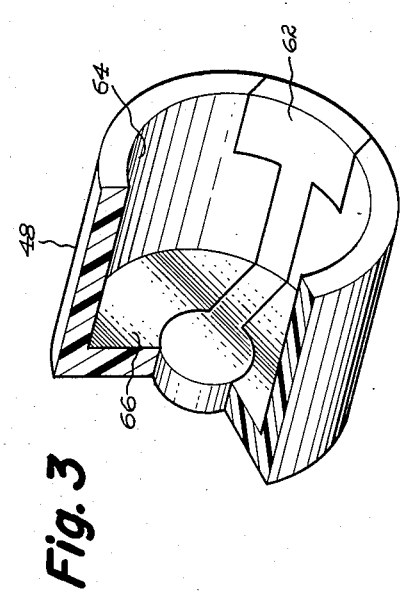
FIG. 3 depicts a perspective view of the removeable charging adapter of FIG. 1 shown partially cut-away.

Referring now to FIG. 3, a perspective view of removable charging adapter 48 is shown partially cutaway. Charging adapter 48 is comprised of a cylindrical first portion 64 open at one end and having a second axially-facing portion 66 disposed at the other end thereof. Charging adapter 48 is thus configured to fit over and surround the positive end of rechargeable battery 34. Cylindrical portion 64 is positioned adjacent the cylindrical side of rechargeable battery 34 and face portion 66 resides axially adjacent battery 34 between positive power terminal contact 46 of battery 34 and discharge terminal 50. Current conducting means 62 carried by adapter 48 may be comprised of a metallic current conducting strip engaging charging contact 40 and extending from the point of engagement axially along cylindrical portion 64 and thence radially inwardly along face portion 66 and into engagement with both power terminal contact 46 and discharge terminal 50.

Figure 4:
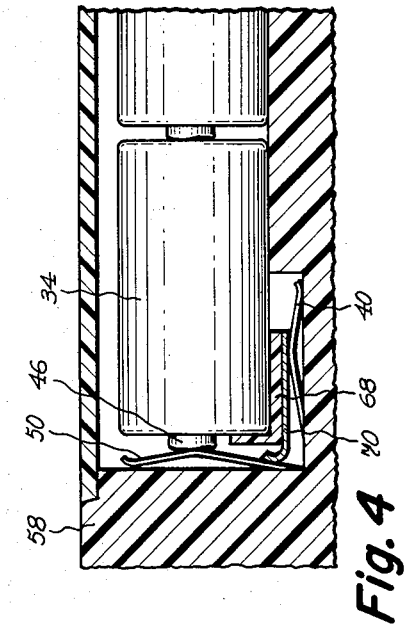
FIG. 4 depicts an alternative embodiment of the present invention.

Referring now to FIG. 4, an alternative embodiment of the present invention is depicted wherein a removable charging adapter 68 includes current conducting means 70 establishing a current conducting path between charging terminal 40 and discharge terminal 50. In this embodiment adapter 68 is not, as with the embodiment of FIG. 3, disposed between power terminal contact 46 and discharge terminal 50. Rather, power terminal contact 46 of rechargeable battery 34 is in direct current conducting engagement with discharge terminal 50. When circuit 12 is in the first mode of operation, charge current is delivered to rechargeable battery 34 through a path which includes charging contact 40 current conducting means 70, discharge terminal 50 and power terminal contact 46. When adapter 68 is removed to accommodate insertion of a non-rechargeable battery, the current path between charging contact 40 and discharge terminal 50 is interrupted and charge current cannot be delivered to the non-rechargeable battery.

I claim:

1. For use in an energy-using device adapted to operate from an external source of A-C power and from either rechargeable type or non-rechargeable type batteries of the same standard size and configuration, a charging system comprising in combination:

a housing for said energy-using device, said energy-using device operable in a first mode when connected to said external source of A-C power to supply said A-C power to a load disposed within said energy-using device and to recharge said rechargeable battery type and in a second mode when disconnected from said source of A-C power to supply power to said load alternatively from said rechargeable or non-rechargeable battery types;

an electrical charging circuit disposed within said housing of said energy-using device for charging said rechargeable battery type when said energy-using device is connected to said external source of A-C power;

a cavity disposed within said housing of said energy-using device for alternatively receiving therein batteries of both of said rechargeable and non-rechargeable types, each of said types having a positive power terminal and a negative power terminal for providing electrical energy from said battery types to said energy-using device;

a pair of discharge terminals for receiving power discharged from either of said battery types, said pair of discharge terminals residing in said cavity and permanently affixed within said housing, one of said pair adapted for current conducting engagement with one of said power terminals of said non-rechargeable battery type and the other of said pair adapted for current conducting engagement with the other of said power terminals of said non-rechargeable battery type;

a charging contact connected in said charging circuit and residing in said cavity, said charging contact spaced-apart from each of said discharge terminals;

a removable charging adapter residing in said cavity when said rechargeable battery type is inserted into said cavity, said charging adapter carrying current conducting means for engaging said charging contact and for providing a current conducting path between said charging contact and one of said power terminals of said rechargeable battery type, the other of said power terminals of said rechargeable battery type engaging one of said discharge terminals whereby said one of said discharge terminals is operable as a second charging contact during charging of said rechargeable battery type, said removable adapter being removable from said cavity when said non-rechargeable battery type is residing within said cavity to preclude charging of said non-rechargeable battery type 2. The invention set forth in claim 1 wherein said removable charging adapter is in current conducting engagement with the other of said discharge terminals.

3. The invention as set forth in claim 2, wherein said charging adapter is interposed between and in engagement with said other of said discharge terminals and with said one of said power terminals of said rechargeable battery type.

4. The invention as set forth in claim 1 wherein said removable charging adapter is in current conducting engagement with said one of said power terminals of said rechargeable battery type.

* * * * *